(12) United States Patent
Jansson Kragh

(10) Patent No.: US 10,875,069 B2
(45) Date of Patent: Dec. 29, 2020

(54) EXTRUSION OF PROFILES UTILISING OPPOSITE ROTATING DIES

(71) Applicant: RELIEFED AB, Varberg (SE)

(72) Inventor: Mark Jansson Kragh, Varberg (SE)

(73) Assignee: RELIEFED AB, Varberg (SE)

( * ) Notice: Subject to any disclaimer, the term of this patent is extended or adjusted under 35 U.S.C. 154(b) by 396 days.

(21) Appl. No.: 15/742,020

(22) PCT Filed: Jul. 4, 2016

(86) PCT No.: PCT/SE2016/050683
§ 371 (c)(1),
(2) Date: Jan. 4, 2018

(87) PCT Pub. No.: WO2017/007410
PCT Pub. Date: Jan. 12, 2017

(65) Prior Publication Data
US 2018/0193891 A1    Jul. 12, 2018

(30) Foreign Application Priority Data
Jul. 4, 2015 (SE) .................................. 1530102

(51) Int. Cl.
*B21C 23/14* (2006.01)
*B29C 48/07* (2019.01)
(Continued)

(52) U.S. Cl.
CPC ............ *B21C 23/142* (2013.01); *B21C 23/08* (2013.01); *B21C 25/02* (2013.01); *B21C 25/025* (2013.01);
(Continued)

(58) Field of Classification Search
CPC ....... B21C 23/142; B21C 23/08; B21C 23/10; B21C 23/14; B21C 23/005; B21C 23/008;
(Continued)

(56) References Cited

U.S. PATENT DOCUMENTS

| 1,696,983 A | 1/1929 | Taylor |
| 4,128,369 A | 12/1978 | Kemerer et al. |

(Continued)

FOREIGN PATENT DOCUMENTS

| CA | 1307889 C | 9/1992 |
| DE | 1909574 A1 | 9/1970 |

(Continued)

OTHER PUBLICATIONS

Extended European Search Report for European Patent Application No. 16821741.2, dated Feb. 12, 2019.
(Continued)

*Primary Examiner* — Shelley M Self
*Assistant Examiner* — Teresa A Guthrie
(74) *Attorney, Agent, or Firm* — Marshall, Gerstein & Borun LLP

(57) ABSTRACT

A device and method enabling industrial continuous pressing, called extrusion of plastically/thermally mouldable substances such as metal, composite metal, plastic, composite or rubber, which is pressed to the profile by a process including a tool fixed member partially predefining the profile shape/cross-section before the profile is finally defined to a cross-section when the material passes rotating dies, which through contact with each other, cancel out main radial forces and the position of which may vary relative to other bearing surfaces or rotary bearing surfaces of the tool with which they define the final shape of the profile. The device and method enable the extrusion of pattern on the inside of hollow profiles and the extrusion of multiple profiles in one tool, because 80-98% of radial bearing forces are eliminated, allowing the installation of rotary dies where not previously possible, and almost unlimited opportunities in increased profile width.

22 Claims, 11 Drawing Sheets

(51) Int. Cl.

| | |
|---|---|
| *B29C 48/09* | (2019.01) |
| *B29C 48/13* | (2019.01) |
| *B29C 48/35* | (2019.01) |
| *B29C 48/285* | (2019.01) |
| *B29C 48/30* | (2019.01) |
| *B29C 48/25* | (2019.01) |
| *B21C 25/02* | (2006.01) |
| *B21C 35/02* | (2006.01) |
| *B21C 23/08* | (2006.01) |
| *B29C 48/12* | (2019.01) |
| *B29C 48/31* | (2019.01) |
| *B29C 48/33* | (2019.01) |
| *B29C 48/315* | (2019.01) |
| *B29C 48/325* | (2019.01) |
| *B29L 7/00* | (2006.01) |
| *B29L 23/00* | (2006.01) |

(52) U.S. Cl.
CPC ............ *B21C 35/023* (2013.01); *B29C 48/07* (2019.02); *B29C 48/09* (2019.02); *B29C 48/12* (2019.02); *B29C 48/13* (2019.02); *B29C 48/25686* (2019.02); *B29C 48/285* (2019.02); *B29C 48/301* (2019.02); *B29C 48/302* (2019.02); *B29C 48/35* (2019.02); *B29C 48/3003* (2019.02); *B29C 48/31* (2019.02); *B29C 48/315* (2019.02); *B29C 48/325* (2019.02); *B29C 48/33* (2019.02); *B29L 2007/001* (2013.01); *B29L 2007/007* (2013.01); *B29L 2023/003* (2013.01); *B29L 2023/22* (2013.01)

(58) Field of Classification Search
CPC ..... B21C 23/01; B21C 23/085; B21C 23/183; B21C 23/212; B21C 23/217; B21C 23/218; B21C 25/02; B21C 25/025; B21C 25/04; B21C 25/10; B21C 25/08; B21C 35/023; B21C 25/00; B29C 48/301; B29C 48/302; B29C 48/35; B29C 48/285; B29C 48/09; B29C 48/07; B29C 48/13; B29C 48/30; B29C 48/25686; B29C 48/33; B29C 48/31; B29C 48/325; B29C 48/3003; B29C 48/25; B29C 48/345; B29L 2007/001; B29L 2007/007; B29L 2023/003; B29L 2023/22
USPC ...... 72/262, 264, 253.2–273.5, 253.1–273.5; 264/209.1, 209.2, 209.8
See application file for complete search history.

(56) References Cited

U.S. PATENT DOCUMENTS

| | | | | |
|---|---|---|---|---|
| 4,237,082 | A | * 12/1980 | Laspisa | ............... B29C 48/92 264/40.6 |
| 4,950,151 | A | 8/1990 | Zachariades | |
| 8,293,156 | B2 | * 10/2012 | Leil | ............... B21C 25/02 264/164 |
| 2003/0011100 | A1 | 1/2003 | Fukumura | |
| 2003/0011101 | A1 | * 1/2003 | Jansson | ............... B21C 23/005 264/209.3 |

FOREIGN PATENT DOCUMENTS

| | | |
|---|---|---|
| EP | 1272330 A1 | 1/2003 |
| JP | S5257072 A | 5/1977 |
| JP | S5861915 A | 4/1983 |
| JP | H01241336 A | 9/1989 |
| JP | 11-058515 A | 3/1999 |
| JP | 2004174563 A | 6/2004 |
| SE | 504300 C2 | 12/1996 |
| SE | 514815 C2 | 4/2001 |
| SE | 531821 C2 | 8/2009 |
| WO | WO-9712745 A1 | 4/1997 |
| WO | WO-01/60582 A1 | 8/2001 |
| WO | WO-0160583 A1 | 8/2001 |
| WO | WO-2009/069081 A1 | 6/2009 |

OTHER PUBLICATIONS

Extended European Search Report for European Patent Application No. 16821742.0, dated Feb. 12, 2019.
Hamel, Pierre, "How to extrude embossed flexible profiles," Plastics Engineering, Jun. 1980.
International Search Report and Written Opinion for PCT/SE2016/050683, dated Sep. 30, 2016.
International Search Report and Written Opinion for PCT/SE2016/050684, dated Oct. 7, 2016.

* cited by examiner

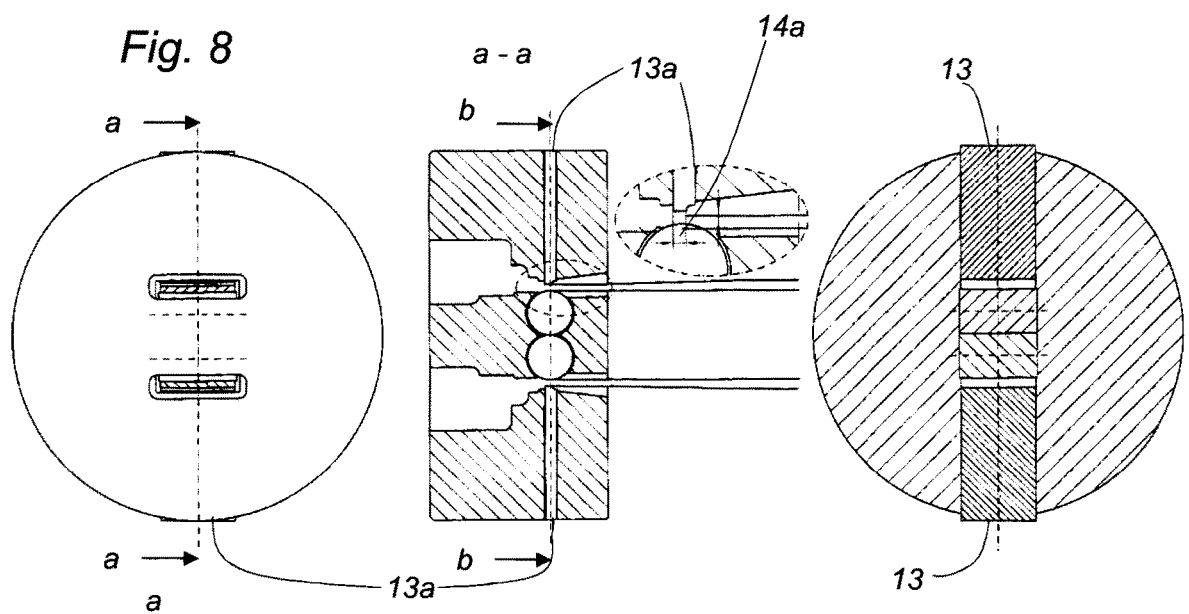
Fig. 8
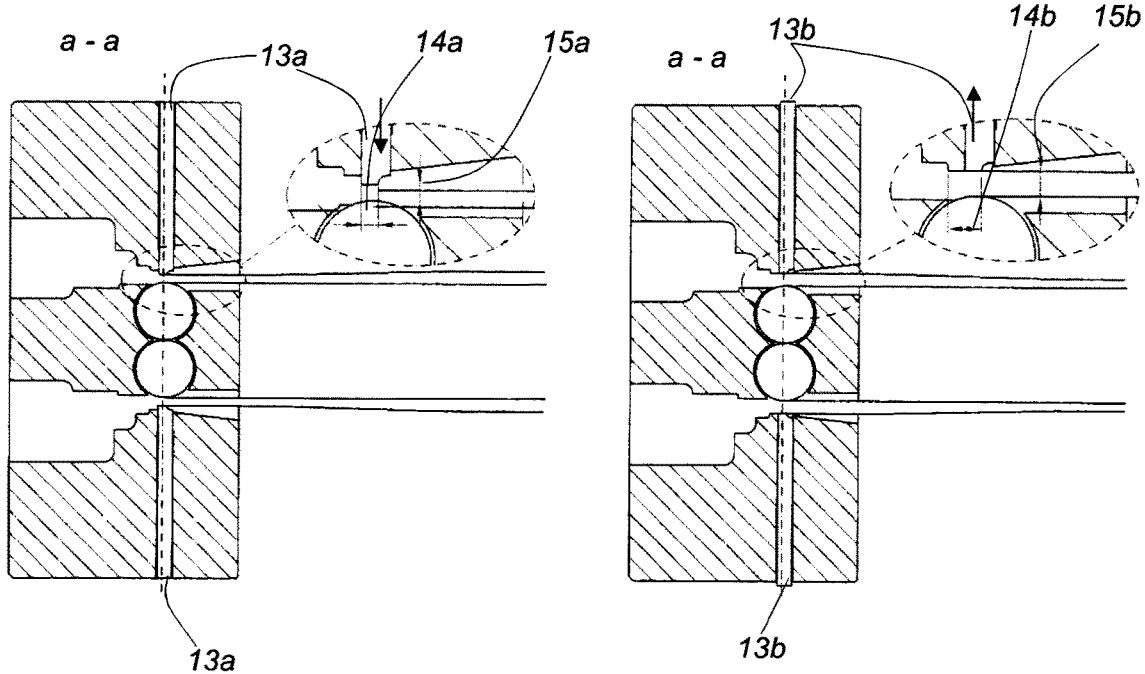
Fig. 9a
Fig. 9b

18b+4b=22c

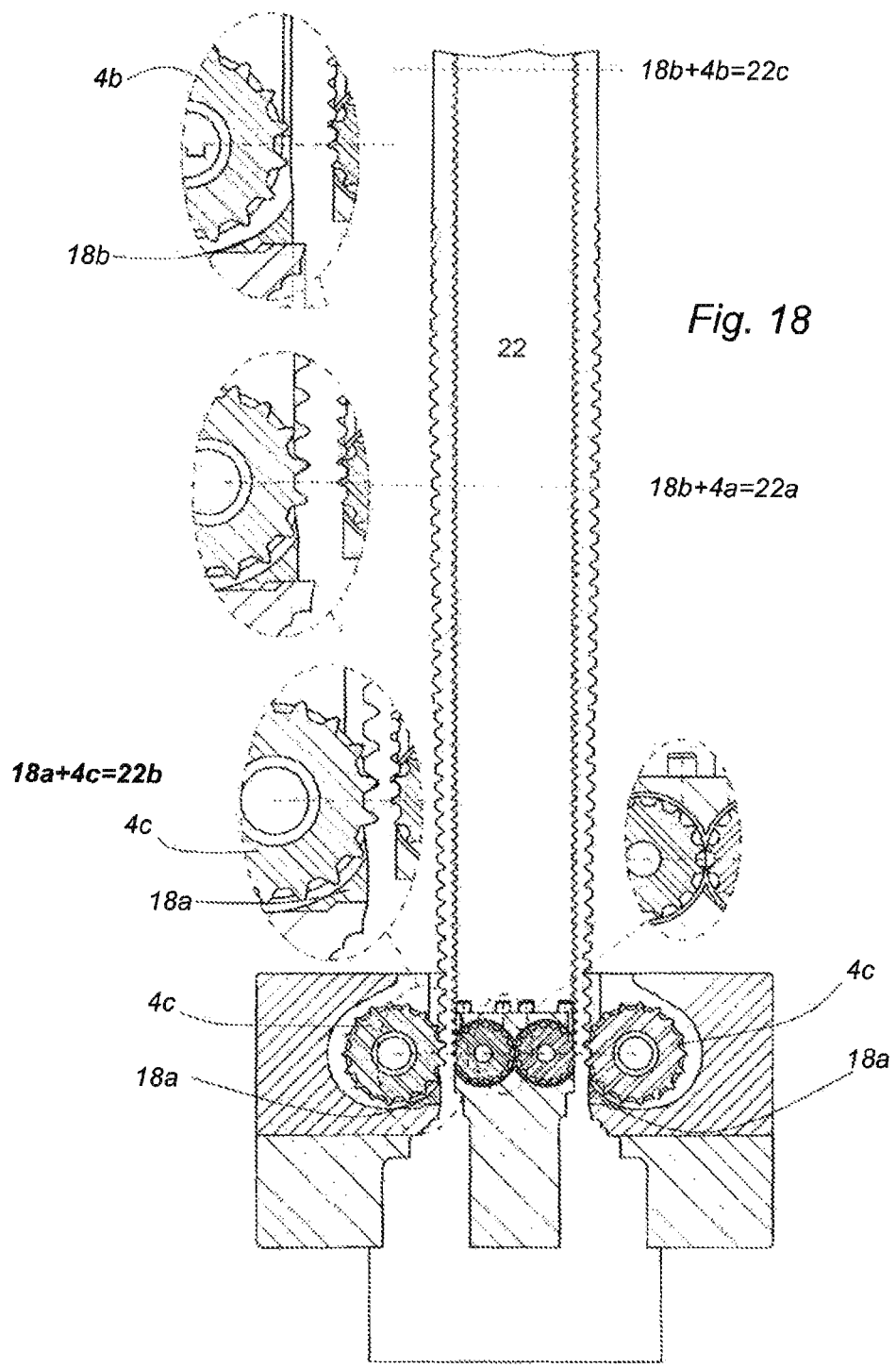

EXTRUSION OF PROFILES UTILISING OPPOSITE ROTATING DIES

TECHNICAL FIELD

The invention relates to device and method enabling industrial continuous pressing, so called extrusion of plastically/thermally mouldable materials such as metal, composite metal, plastic, composite or rubber, which is pressed to the profile by a process comprising tool fixed part partly predefining the profile shape/cross-section before profile shape finally is defined to fixed or varied cross-section when the material passes rotating dies which can be patterned or smooth and by the contact with each other cancel out each other main radial forces and the position of which in some embodiments of the invention may vary relative to other bearing surfaces (13) or rotary bearing surfaces in tool with which they define the profile's final form, whether rotating dies are patterned or not.

The invention enables the extrusion of pattern on the inside of hollow sections and eliminates 80-98% of the radial bearing forces, which reduces the cost of manufacturing tools and opens up new possibilities when the radial forces do not limit the profile width.

Further, the invention solves the problem of varied output speeds and varied stretch and pull+pressure forces arising at extruded/pultruded profile for the production of profile with varied cross section.

TECHNICAL BACKGROUND

In continuous pressing of plastic deformable materials, such as heated metals such as copper, titanium and aluminium, so-called extrusion, the blank passes an opening that defines the profile cross-section.

Previous attempts have been made to extrude with rotary dies to provide some variation, however, this has been problematic inter alia due to high bearing loads.

Often you want to in different applications have beams and profiles with patterns, teeth, varied wall thickness, anti-slip surfaces, integrated logo etc. This is because a profile that has the same cross section and appearance all the way do not meet the requirements that satisfy customer's product and application requirements regarding design, function and performance in sectors such as construction, consumer goods, structural applications, transportation, aerospace, automotive and design. The traditional methods first manufacturing profiles and then machining to get varied thickness/pattern usually requires large costs for processing and machining equipment. An alternative method for extruding first and then process the profile is the use of rotating patterned dies during extrusion, leaving a "negative impression" in the profile while its cross section is defined.

This has been described in Technical Papers (ex. Way "How to extrude embossed flexible profiles" by Pierre Hamel in Plastics Engineering belt 36, No. 6, June 1980 pp. 34-35), which describes how to use the rotary dies (see engraving wheel FIG. 1) extruding patterned plastic profiles.

Another method to obtain profiles with patterns described in the patent EP 1272330 B1 by the innovator D. Czekay which using a circulating "caterpillar tracks like" stamping body, whose relief-like embossing patterns moving in roughly the same pace as the extruded profile.

Another patent of the present inventor Mark Jansson describes extrusion with rotating dies are SE504300 (C2), which describes how to extrude steplike profiles. However, it is generally not possible to proceed in accordance with the described patent if, for example will extrude materials requiring high pressure to achieve sufficient plasticity when the force that the rotating die is exposed to would be so large that it would be bent and the bearings that hold the same would break down. In the extrusion of aluminium, copper, magnesium, titanium, metal composites, etc. it may be required several thousand kilograms of pressure per square centimetre, thus rendering the method described in SE 504 300 (C2). This is due to both forces material flow conditions.

The patent SE514815 (C2) shows one of the current inventors invented method giving a more realistic version to extrusion by means of rotary dies, this patent has very strong similarities with Pierre Hamel Technical Paper of 1980.

In SE Patent 531 821 of the current candidates is shown how to avoid problems at startup, using the profile stretching device that pulls and steer the profile immediately in startup. It is also shown how to work with rotary dies that are raised and lowered in order to facilitate start up of the extrusion.

Both the patent SE504300 (C2) and the patent SE514815 (C2) can be said to describe the procedure for extrusion with rotating dies acc. Pierre Hamel's instructions.

SE514815 (C2) is in practice very limited in the possibilities when it comes to extrude profiles with varied thickness and varied tread depth, because there are problems with the adhesion between the thin weak wall profile at startup, due to engagement adhesion and adhesion between the surface of the rotating die and the extruded material.

The same applies when making profiles with large tread depth relative to thickness, the profile will tend to "follow" the rotating die around at startup and billet changes, which means very high risk for process stop and tool failure.

Furthermore, one can in proceeding pursuant SE514815 (C2) and other writings not extrude hollow sections with patterns on the inside and wrestle constantly with very high radial loads on rotating die, shafts and bearings, causing expensive tools and limitations in profile width, the imprint depth and problems with large tools.

The large bearing forces has meant that one has been forced to have bearings beside the rotating dies, as it has not been possible to integrate bearings strong enough in the rotating dies.

This has in practice resulted in that it from a technical and/or economic reasons have been almost impossible to extrude more than one metal profiles in one tool simultaneously due to the large forces previously required large bearings at the rotating die shaft ends—something that there is limited space for in tools, and that weakens the tools, as this requiring the removal of large quantities of material from which tools to insert bearings.

Furthermore, the possibilities were previously limited for variation of the cross sectional area in practice by the cyclical process that the rotating die perimeter and variation constitutes.

SUMMARY OF THE INVENTION

The present invention enables a variation of the thickness and tread depth in reality through consideration of factors such as variation of the pressure drop and exit speed, both of which vary when varying the outlet area/cross section of the profile:

A reduced outlet area =increased pressure drop and at constant speed on the material feeding side into the extrusion/pultrusion die will result in a higher outlet speed and potentially big problems with increased temperatures and erratic outcoming profile: for example, giving a halved outlet area double the outlet velocity at continuous feeding of extrusions material, which more or less is an adjunct leading to large process problem with varying quality on the basis profile and is likely to process breakdown. This is because the outbound profile must rapidly accelerate and deceleration resulting in very large varied loads between back pressure and tension loads of outgoing material directly on the tools' outlet, bearings, where the material is at its warmest and softest and most dependent on a continuous stretch/control—resulting in the profile easily lose control and come with rotating die and plugs the tools outlet, —the process of breakdown is a fact. Another aspect is the dependence between the maximum extrusion and cross-sectional area of a profile and the thickness of the profile extruded/pultruded, which is particularly sensitive in billet feed extrusion lines, the so- called extrusion ratio is very crucial (extrusion ratio =input material area from ingots in relation to the outgoing profile area)_. A high extrusion ratio reduces the maximum outlet rate of extruded/pultruded profile due to, among other things heat buildup and flaking.

Flaking is a phenomenon that occurs when you try to extrude/pultrude in high speed and output profile has been difficult to hold together, due to the forces of friction between the outgoing profile and bearing surfaces and area reduction, exceeding or approaching outgoing materials maximum speed and cracks which generally goes across extrusion/pultrusion direction. An increased area reduction results in other words, an increase in the risk of scaling, while speed is increased on the outgoing profile, if one does not take this into account. in other words, would a feed of into the extrusion/pultrusion tool result in the profile goes faster when there is a reduced cross sectional area (as it would be wise to rather have a reduced outlet speed of not getting flaking and/or overheating of outgoing material). This object is solved, according to the present invention, by varying the speed/volume per unit time that material feeding extrusion/pultrusion tool in in order to either allow such constant outlet speed as possible on the outgoing profile, or decreases outlet rate, to avoid risk of flaking/overheating of outgoing material, when the smaller profile area is run.

Naturally, this includes synchronizing puller that holds the profile tensioned.

The implementation of the present invention is applicable in all types of extrusion lines, with minimal or no need for adaptation of the plant, including the hydraulic metal extrusion plants, screw extruders to rubber plastic and conform extrusion lines etc.

The purpose of the present invention is to enable repeatable industrial production of one or more profiles can exhibit patterns and/or varying cross section and solves problems with large bearing forces, which makes it possible to: 1. make hollow sections with patterns on the inside 2. fit more rotary dies and thrit bearings in the tool which allows one to make tools that extrudes multiple profiles simultaneously (a necessity for efficient production of smaller profiles) 3. make the tools cheaper, less complex and more compact.

The invention further enables variation of profile cross-section of the desired cycle without limitation to the cycle corresponding to the circumference of the rotating die.

The ability to vary the thickness and/or varying+eliminate tread depth can minimize adhesion between extruded profile at start up and billet changes, while enabling thicker profile walls in these moments, to further stabilize the process and eliminate these problems so far has obstructed successful commercial extrusion with rotating dies.

Unlike the prior art, use is made of two rotary dies that are in contact with each other and cancel out each other radial forces, which virtually eliminates the radial forces and thereby reduces the need and problems with large bulky radial bearing.

Explanations of context, nomenclature and in patent used words:

Extrusion: Procedure in which a material under pressure is pressed through a profile shaping tool (also called die) with hole(s) that defines the outgoing materials cross-section and appearance.

Dynamic extrusion: A method wherein a material under pressure is pressed through a shaping tool that provides the profile a diverse cross-section and circumference of or shape in the form of example patterns on one or more surfaces and dimensional changes in cross sectional area and or goods thicknesses.

Die: Generally, the name used by professionals for profile production tools.

Rotating die: Rotating profile-shaping member/organ in die.

Pressure drop: Reduction of pressure by the tool is a result of area-reduction, plastic exemplary work and friction. At metal extrusion converted large amounts of energy to heat, as a result of pressure. By "pressure drop balancing"—making adjustments to the pressure drop in the tool, the outgoing material get the same speed in all parts.

Flow imbalance: Imbalance means that the outgoing material will or want to come out with higher or lower speed at certain parts of the profile cross-section. A profile extruded in a tool with the imbalance may be less resistant (due to internal tensions), tend to dent or bend and at the extrusion with rotating dies result is often the process breakdown.

Bearing Surface: The surface of an extrusion die in the smallest cross section that the extruded material is forced through under pressure and thus constitutes the surface to finally define the profile cross-section and appearance.

Static Bearing Surface: A bearing surface the extruded material is forced to pass at a relative speed of outgoing profile speed, because it is static, so that means there is a speed difference between the static bearing surface and the extruded material, resulting in a lot of friction and heat. By regulating the length of the bearing surfaces can regulate the total amount friction and thus the pressure and speed of the outgoing material.

Rotating Bearing surface: A rotating bearing surface is a surface of the rotating die/member that defines the profile cross-section, making patterns possible as well as wall-thickness variation. A rotating bearing surface in general generates much less resistance/friction against the flowing material than a static bearing surface, which previously has created major problems with the imbalance between the different parts of the profile cross-section, which is defined by the rotating bearing surfaces and the parts that are defined by static bearing surfaces.

Pre-Bearing/Pre-Bearing Surface: The surface area that the extruded material passes just before it comes to the rotating die/forming member and its rotating bearing. The pre-bearing brings down the material cross section so much so that the subsequent rotating die won't have to take up unnecessarily large forces from the extruded material. Pre-bearing has in combination with preceding shape in the die upstream a central role for control and/or redulation of material flows through the die.

Puller/Profile Puller: At the extrusion of metal profiles, it is customary that when one has squeezed out enough profile to reach the ordinary puller (usually 3-7 meters from the die) to stop extrusion, grip profile and then pull the profile and then re-start the extrusion.

With extrusion of plastically thermally deformable material with rotating shaping dies i units means pressing of example, metal, rubber, plastics, metal composites, ceramics and plastic composites through extrusion tool, also called die, which has one or more so-called rotating dies integrated in the static die and where the cross section at some extent is, as in Pierre Hamel Technical Paper, defined before the extruded material in pressurized zone reaches the rotating die and whose outer radius possible pattern is called a rotating bearing surface defining the profile appearance and cross section in cooperation with other bearing surfaces.

These objects are achieved by the invention as hereinafter will be described in different embodiments:

The dies can be patterned as well as smooth, or combinations out of both.

The outer rotating dies can be raised and lowered independently of other cycles in the process. This also applies to the movable bearing inserts and height adjustable bearings.

The variable outer dies, bearing inserts and height adjustable bearings enables variation of the thickness and pattern of any length cycle. They also make it possible to facilitate the start-up and billet changes, by ensuring start up of tools with thickest profile and minimal imprint of the outer rotating dies, all to get the maximum profile stability, while reducing the risk of adhesion between the rotating dies and extruded materials.

The rotating dies should be cooled to maintain a temperature difference between the extruded material and rotating dies, to avoid overheating of the rotating dies and profiles which will otherwise stick together.

BRIEF DESCRIPTION OF THE DRAWINGS

The present invention will now be described with reference to the accompanying drawings which of example illustrate preferred embodiments of the invention, the invention is not limited to those in the drawings exemplary embodiments, but may be of ordinary skill performed in several combinations of the various variants and with more rotating dies.

FIG. 8 shows a third embodiment of the invention where varying the material thickness of the exiting profiles, by varying the bearings position and length.

FIGS. 9a and 9b show the relationship between the bearings length and thickness profile is kept reasonably constant at varied thickness—which is important to balance the flow and stable process.

FIG. 18 shows how to vary the thickness and patterns by varying the position of the rotating dies and adjustable bearings.

DETAILED DESCRIPTION OF EXEMPLIFYING EMBODIMENTS

Figure 1:
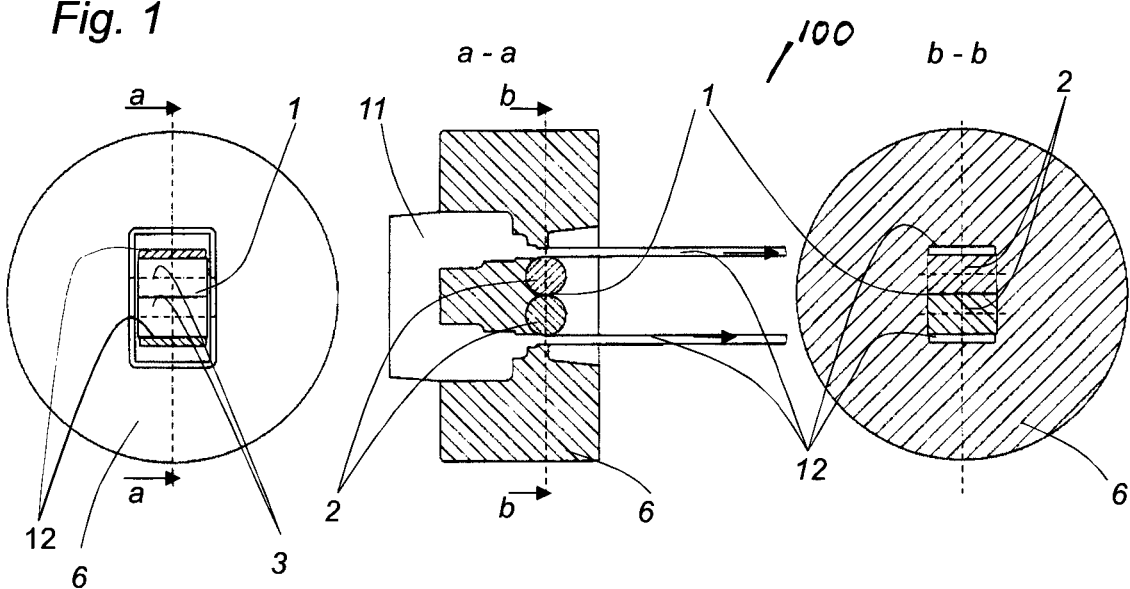
FIG. 1 shows a first embodiment of the invention, extruding the two smooth profiles.

In FIG. 1 shows schematically a first embodiment of the invention consisting of the fixed tool part (6) with static bearing surfaces and two integrated rotating dies (2) which in cooperation form the incoming material (11) to two extruded smooth profiles. The two rotating (2) dies are in contact with each other (1) and the opposing force resultants from the plastic work take out each other. The device according to example embodiments is here generally indicated by reference numeral 100.

Figure 2:
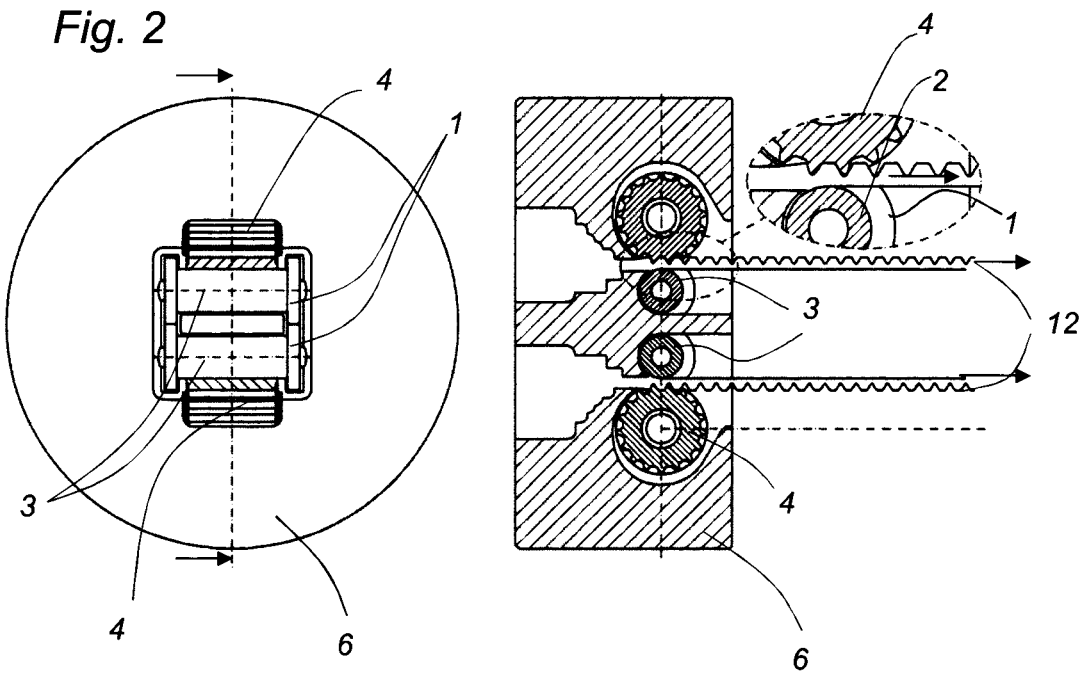
FIG. 2 shows a second embodiment of the invention, extruding the two profiles with pattern on one side.

FIG. 2 shows a second embodiment of the invention, extruding the two profiles with pattern on one side. In this embodiment outer rotating dies (4) are on opposite sides of the inner rotating dies (2) to achieve a teeth rack pattern. The inner rotating dies here are built in such a way that the shaping surfaces (3) is not the same as the surfaces (1) which transmit and even out opposing force resultants from plastic work.

Figure 3:
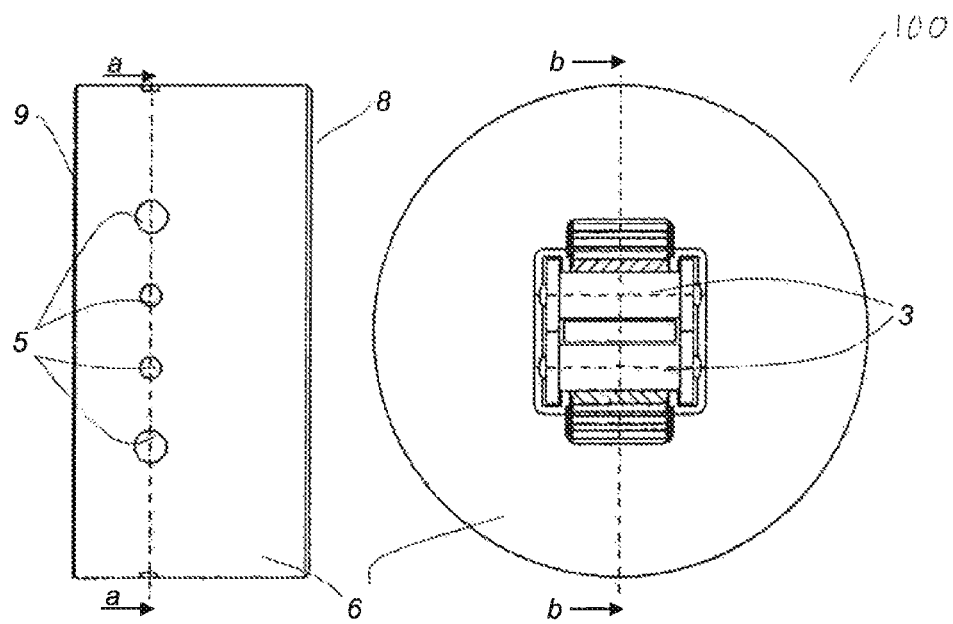
FIG. 3 shows the side view and the outlet of the second embodiment of the invention.

FIG. 3 shows the side and outlet of the second embodiment of the invention, and clarifies that only need small holes (5) next to the rotating dies in the fixed tool part (6), resulting in strong cheap tools, with plenty of room for more rotating dies, which in turn makes it possible to make relative to simple tools extruding multiple profiles at once.

Figure 4:
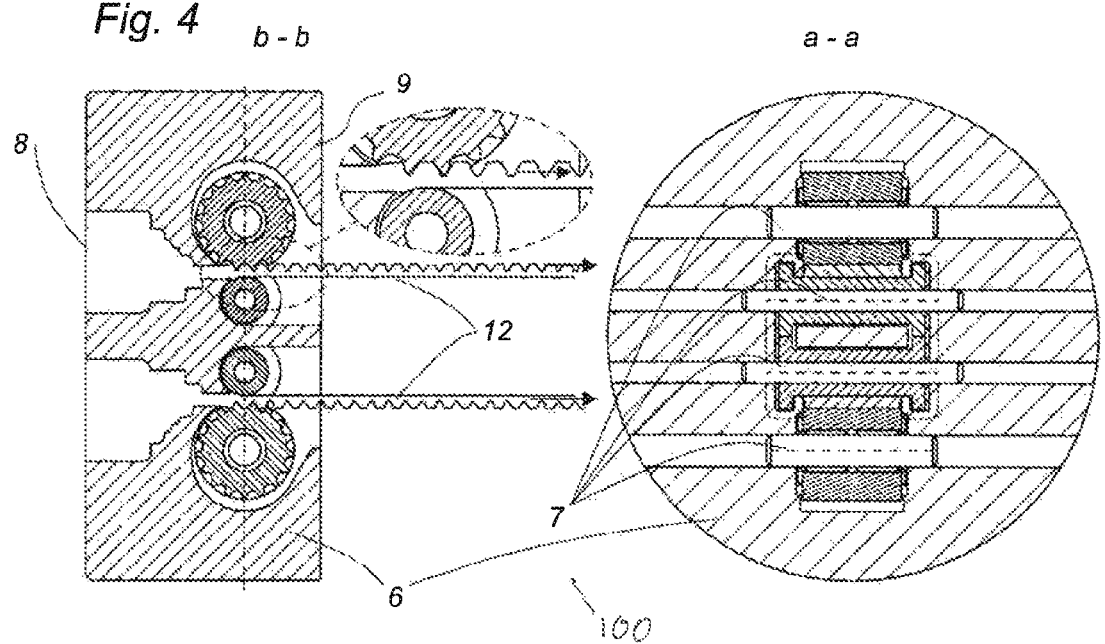
FIG. 4 shows the cross section from the side and from outlet of the second embodiment of the invention.

FIG. 4 shows the cross section from the side and from outlet of the second embodiment of the invention showing how the rotary die the axes (7) are integrated.

Figure 5:
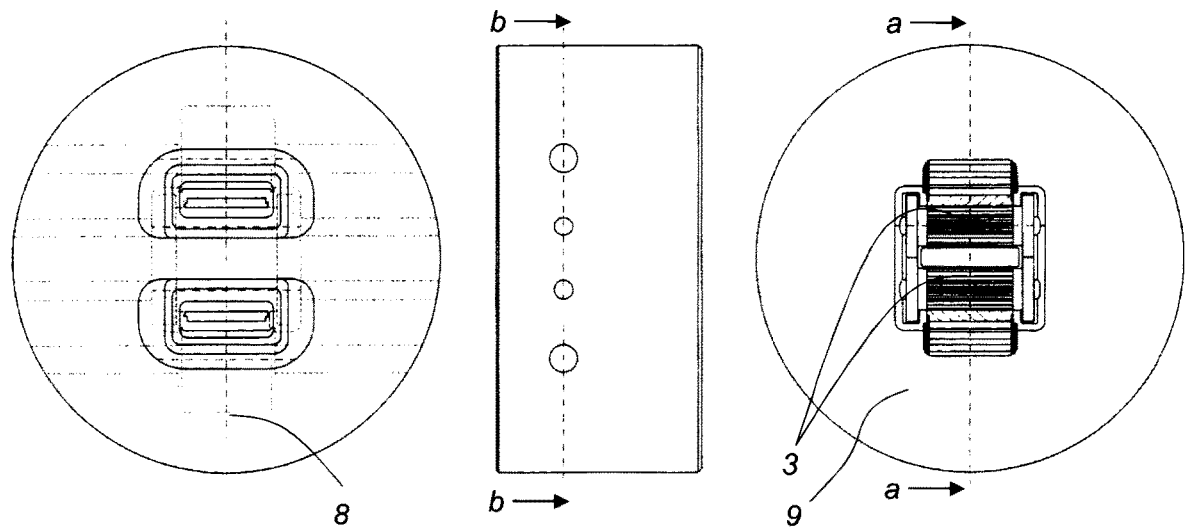
FIG. 5 shows the inlet side and the outlet of the second embodiment of the invention, to make patterns on both sides of the two profiles.
Figure 6:
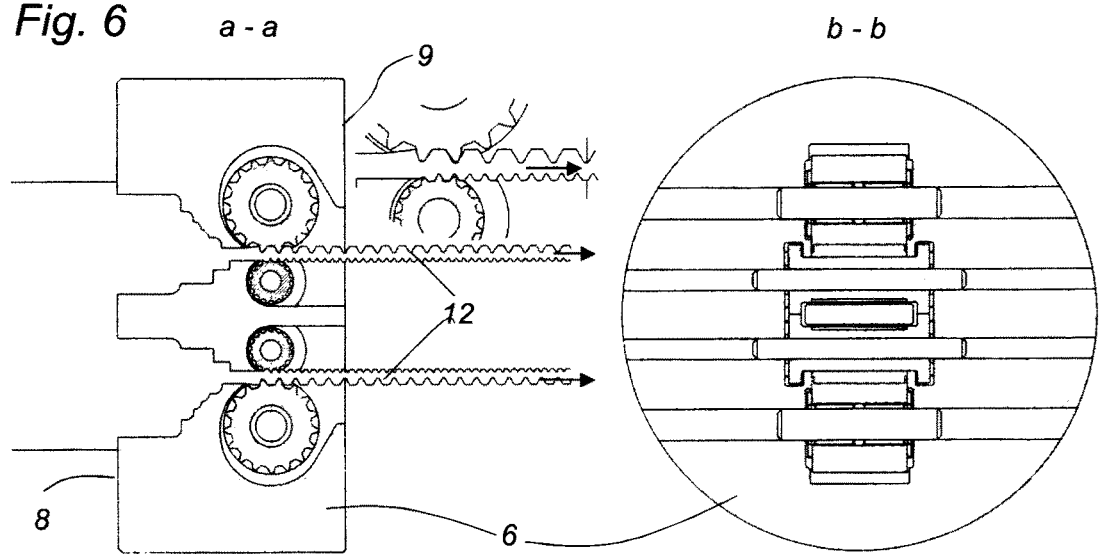
FIG. 6 shows the cross section of the second embodiment in which to make patterns on both sides of the two profiles.

FIG. 5 shows the inlet (8) and the outlet (9) of the second embodiment of the invention, to make patterns on both sides of the two profiles (12).

Figure 7:
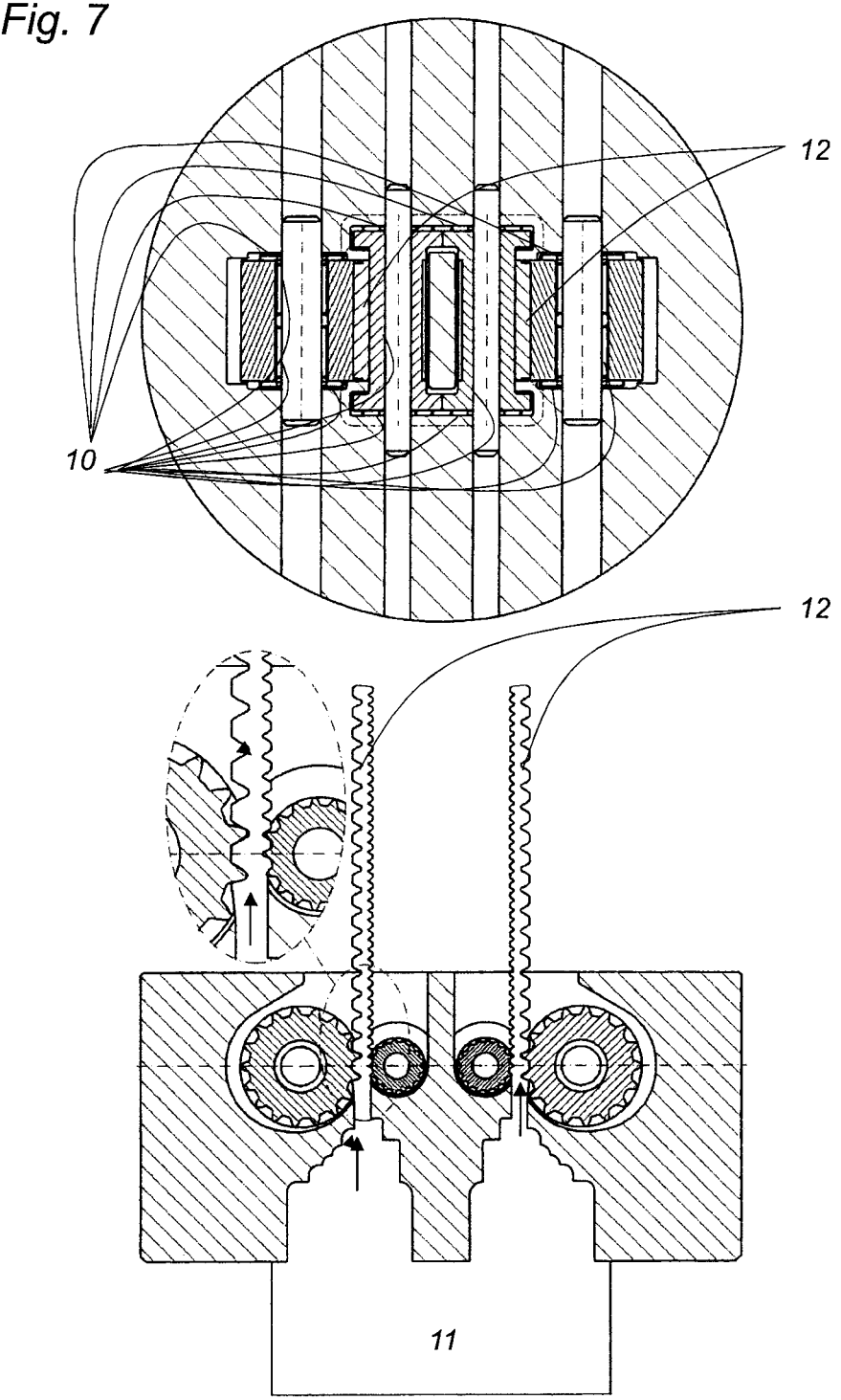
FIG. 7 shows how the different Axial and radial bearings can be configured in the tool according to the second embodiment

FIG. 7 shows how to manage to take up radial forces with needle and plain bearings (10) that are integrated into the rotating dies and how to thrust needle bearing means fixes the rotating dies axial positions in a tool.

FIG. 8 shows a third embodiment of the invention where varying material thickness of the exiting profiles, by varying the bearings (13, 13a, 13b) position.

FIGS. 9a and 9b show how the relationship between the bearings length (14a, 14b) and profile thickness (15a, 15b) are kept reasonably constant at varied thickness, by allowing static bearing surface in fixed die member cooperate with variation of the bearing length—which is important to get balance in the flow and stable process.

Figure 10:
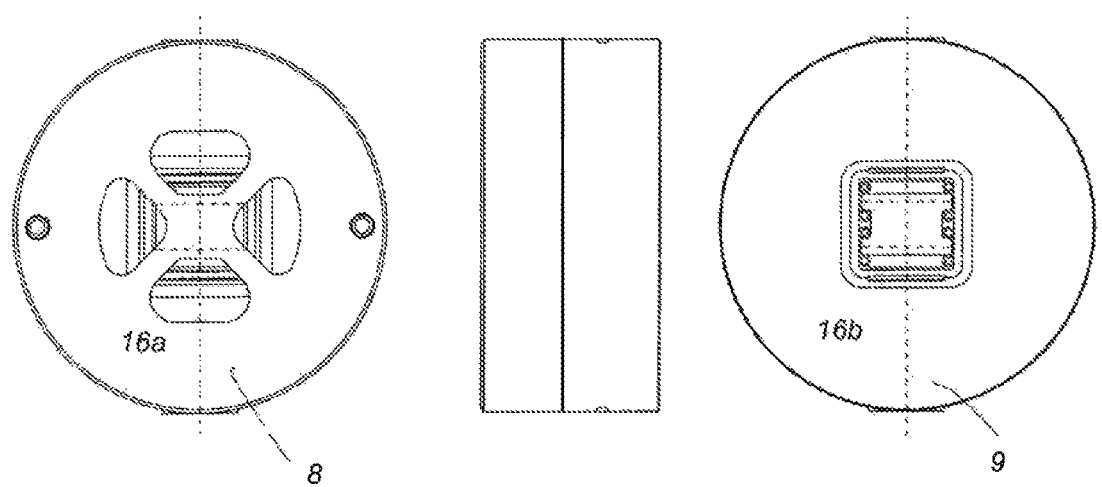
FIG. 10 shows the inlet, side and outlet of the invention in a fourth embodiment to extrusion of hollow section with varied thickness.

FIG. 10 shows the inlet, side and outlet of the invention in a fourth embodiment to extrusion of hollow profiles with varied thickness.

Figure 11:
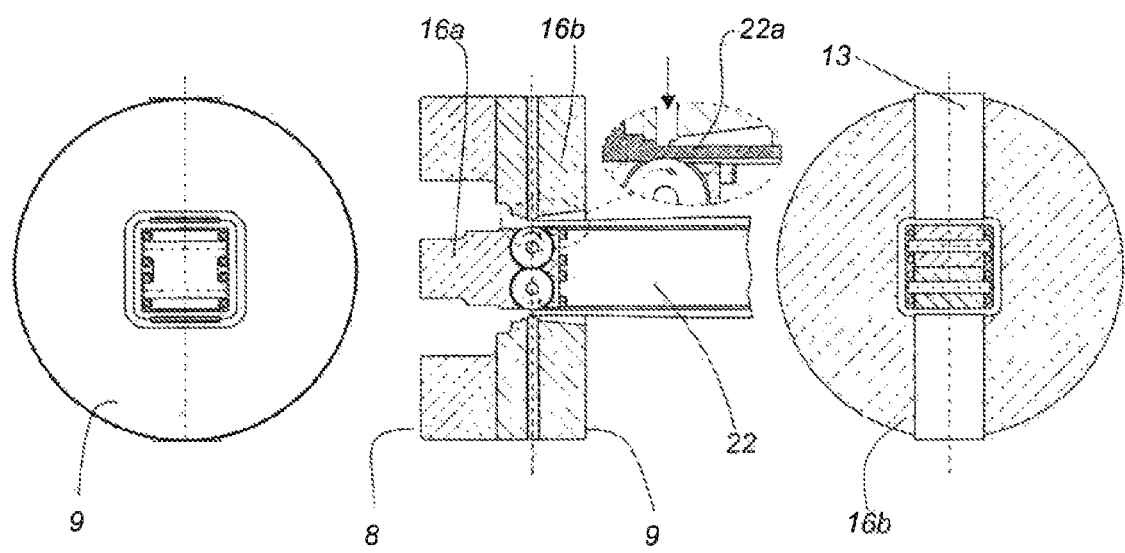
FIG. 11 shows the outlet and side views of the invention in FIG. 10.

FIG. 11 shows the outlet and sectional views of the invention in FIG. 10. In this FIG., One can also see how the inner rotating dies are arranged in the tool core portion (16a).

Figure 12:
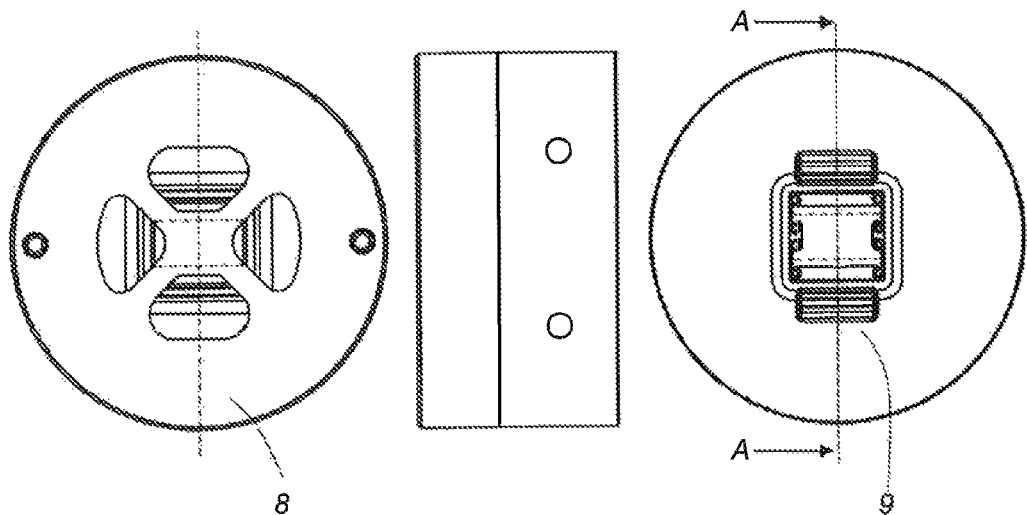
FIG. 12 shows a fifth embodiment of the invention enabling extrusion of hollow sections with patterns on both the inside and outside.
Figure 13:
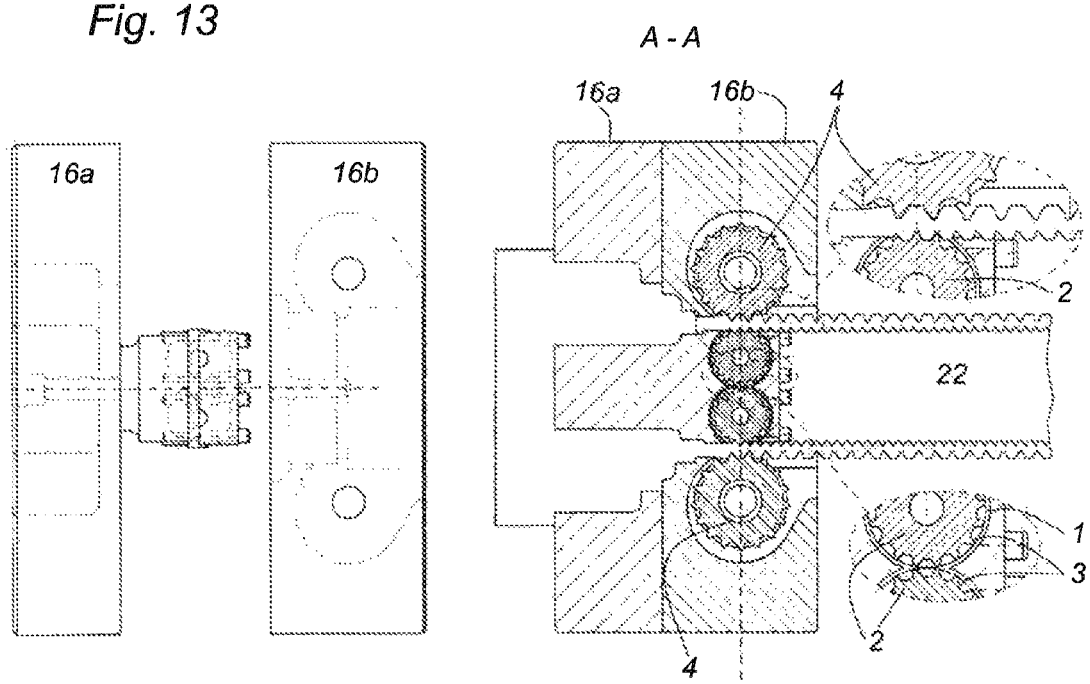
FIG. 13 shows the two static head portions separated and the cross section of the fifth embodiment.

FIGS. 12 and 13 show a fifth embodiment of the invention enabling extrusion of hollow sections (22) with pattern on both the inside and outside. The inner rotating dies (2) in this embodiment has smooth portions (1) which transmit and even out opposing force resultants from plastic work, so that the radial bearings and shafts need only take up less forces.

FIG. 13 shows the two main parts static core portion (16a) and the bore portion (16b) separated and cross section of the fifth embodiment.

Figure 14:
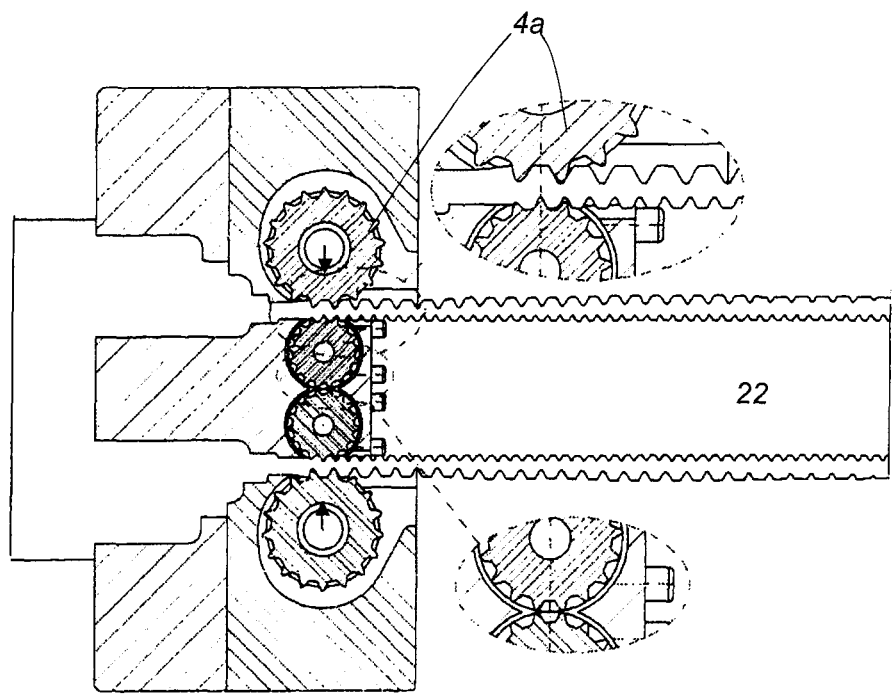
FIGS. 14 and 15 show a sixth embodiment of the invention, which enables extrusion of hollow profiles with pattern on the inside and outside while one can vary the thickness and pattern on the outside.
Figure 15:
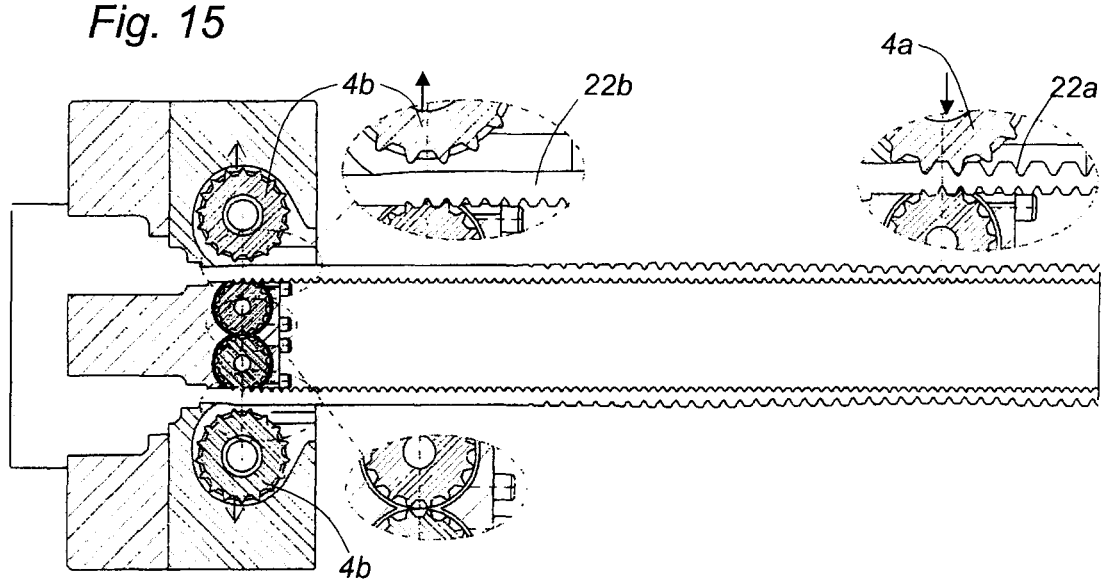

FIGS. 14 and 15 show a sixth embodiment of the invention, by raising (4b) and reduction (4a) of rotating dies enabling extrusion of hollow profiles with pattern on the inside and outside while one can vary the thickness and pattern on the outside. This embodiment of the invention can also be performed to extrusion of two or more separate profiles of varying thickness and varying tread depth.

Figure 16:
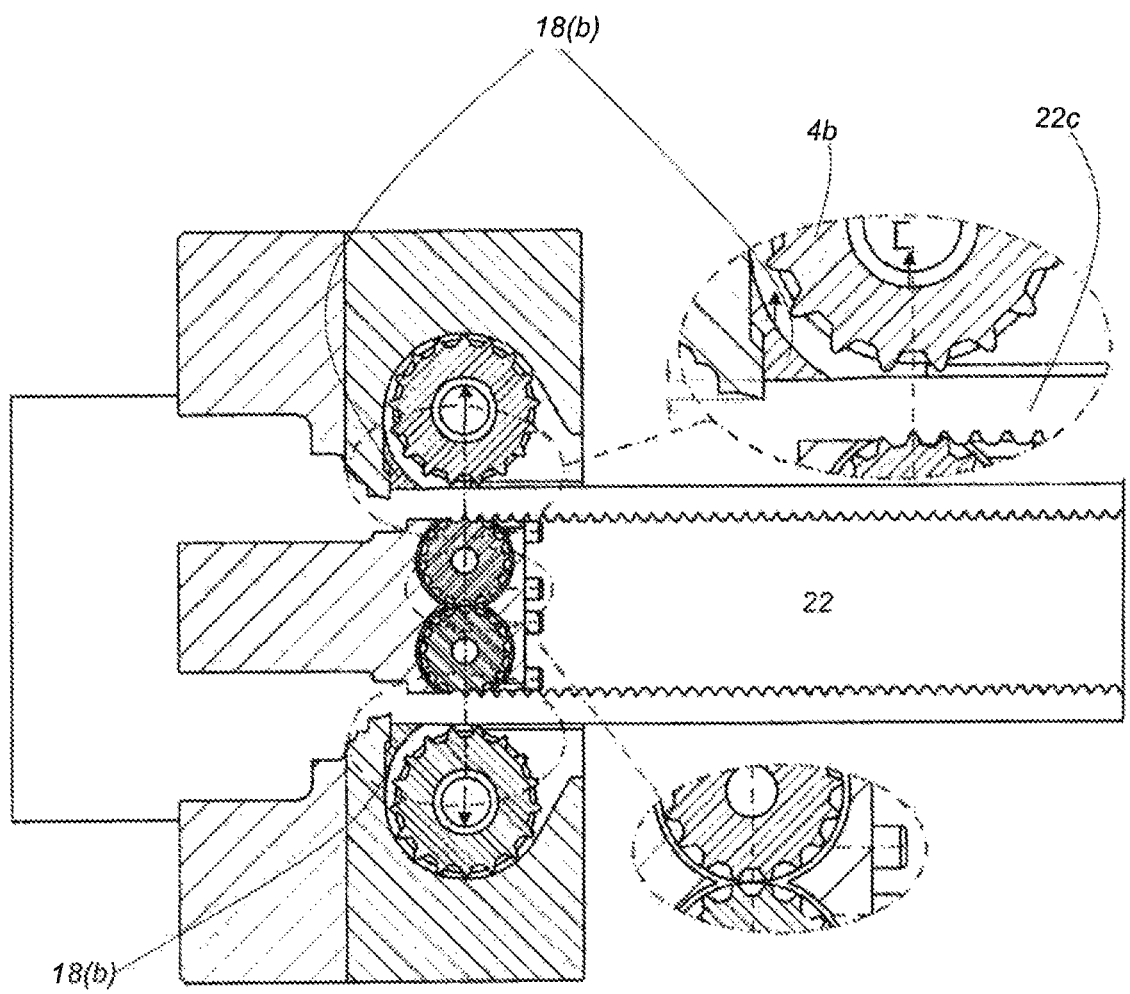
FIG. 16 shows a seventh embodiment of the invention comprising an adjustable le pre bearing that provides additional possibilities of varying the thickness and pattern.

FIG. 16 shows a seventh embodiment of the invention comprising an adjustable pre bearing (18b) that provides additional possibilities of varying the thickness and pattern. One can also see how the combination of half-lowered pre bearing (18b) and completely raised rotating die (4b) resulting in a hollow profiles with patterned inside and smooth outer surface (22c) thereof 18b+4b=22c.

Figure 17:
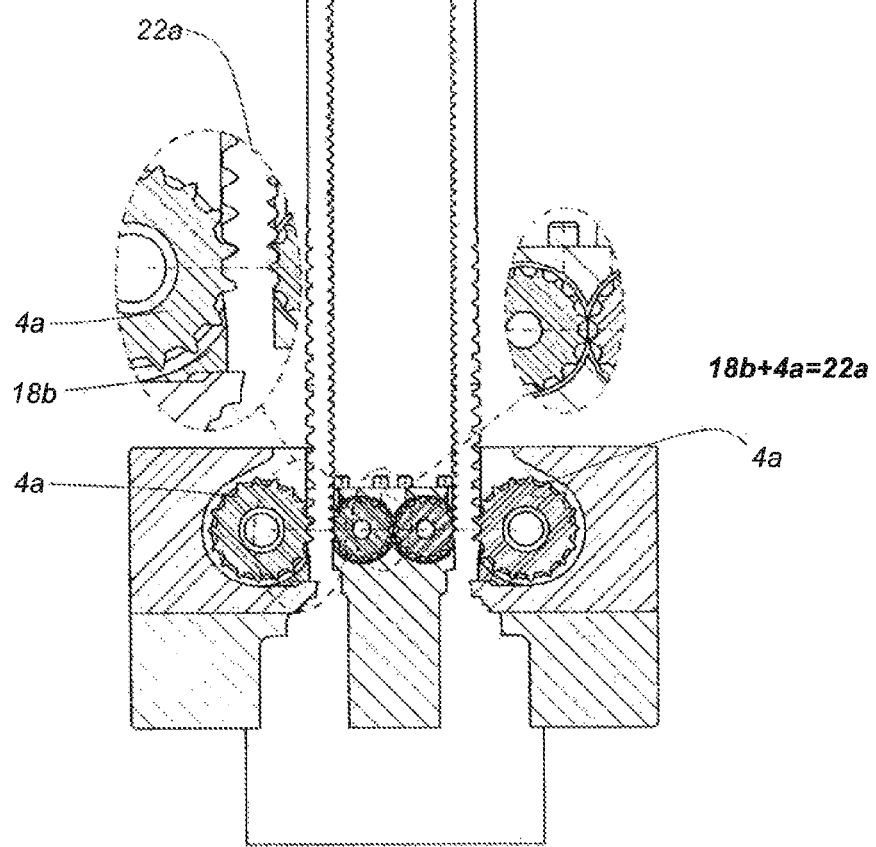
FIG. 17 shows how patterns can vary by varying the position of the rotating dies.

FIG. 17 shows how patterns can vary by varying the position of the rotating dies (4a, 4b) relative to the adjustable pre bearing (18b).

FIG. 18 shows how to vary the thickness and pattern (22a, 22b, 22c) during extrusion of the hollow profiles with (22) by varying the position of rotating dies (4a, 4b, 4c) and adjustable bearings (18a, 18b). This can of course also be carried out during extrusion of non hollow sections.

The invention claimed is:

1. A device for the extrusion of plastically/thermally deformable material to one or more profiles of fixed or variable cross section, the device comprising a static parts matrix coupled with multiple inner rotary dies, said inner rotary dies at least partly defining a profile cross-section and variation, wherein surfaces of said inner rotary dies are in direct contact with each other so as to allow a transfer, and facilitate a cancellation, of opposing radial forces acting on said inner rotary dies from said plastically/thermally deformable material.

2. The device according to claim 1, wherein surfaces are power transmitting surfaces and are not constituted by shaping surface portions of the inner rotary dies.

3. The device according to claim 1, further including outer rotary dies acting as dies for the opposite side of the extruded profile.

4. The device according to claim 1, wherein said static parts matrix includes one or more movable bearing inserts.

5. The device according to claim 4, wherein the device is constructed so that when the one or more moveable bearing inserts are in an outer position, a pre-bearing of the static parts matrix and a bearing by the one or more moveable bearing inserts come in line, whereby the bearing becomes an extension of the pre-bearing and a bearing length can be increased as the profile thickness increases.

6. The device of claim 1, wherein the inner rotary dies are located in a core portion of the static parts matrix.

7. The device according to the claim 6, wherein at least one movable bearing insert can be raised or lowered in a static tool part of the static parts matrix and configured to allow adjustment of the material thickness.

8. The device according to claim 6, wherein the static parts matrix has outer rotary dies in a bore portion of a static tool part of the static parts matrix.

9. The device according to claim 8, wherein the outer rotary dies are adjustable in height and are with adjacent adjustable pre-bearings.

10. The device according to claim 3, wherein the outer rotary dies are with adjustable in height and are adjacent adjustable pre-bearings.

11. The device according to claim 1 wherein the inner rotary dies have bearings for the radial forces built in.

12. The device according to claim 1 where in the device contains 2, 4, 6, 8, 10, 12, 14, 16, 18, 20 or more inner rotary dies in pairs which cancel out radial forces exerted between inner rotary dies of each pair.

13. The device according to claim 1 wherein the inner rotary dies have a surface having a low adhesion coefficient to thereby lower the adhesion coefficient between inner rotary dies and the material.

14. A method for the extrusion of plastically/thermally deformable material by the device according to claim 1, wherein the method comprises the step of shaping the plastically/thermally deformable material in contact with the inner rotary dies so that the surfaces of the inner rotary dies are in direct contact with each other and transmit opposing radial forces acting on said inner rotary dies so that these radial forces, from said plastically/thermally deformable material, cancel each other out.

15. The method according to claim 14, wherein said surfaces of the inner rotary dies in direct contact with each other are power transmitting surfaces and are not constituted by shaping surface portions of the inner rotary dies.

16. The method according to claim 14, wherein outer rotary dies shape an outer side of an extruded profile, opposite the inner rotary dies.

17. The method according to claim 14, wherein the material thickness of an extruded profile is varied by varying the position of one or more movable bearing inserts located in said static parts matrix.

18. The method according to claim 14, wherein said inner rotary, dies are located in a core portion of the static parts matrix, and wherein the inner rotary dies and the core portion define a shape of the inside of the extruded profile.

19. The method according to claim 18, further comprising varying the material thickness of the extruded hollow profile by varying the position of one or more movable bearing inserts.

20. The method according to claim 18, further comprising outer rotary dies that act as dies for the outside of the extruded profile.

21. The method according to claim 20, wherein the thickness of an outgoing profile is varied by raising/lowering the outer dies.

22. The method according to claim 20, wherein a thickness and pattern is controlled by raising/lowering the outer rotary dies and/or raising/lowering a pre bearing.

* * * * *